United States Patent [19]

Seng

[11] 4,413,970
[45] Nov. 8, 1983

[54] ROTARY SCRAPERS

[75] Inventor: Stephen Seng, Frazeysburg, Ohio

[73] Assignee: Owens-Corning Fiberglas Corporation, Toledo, Ohio

[21] Appl. No.: 238,884

[22] Filed: Feb. 27, 1981

[51] Int. Cl.³ .............................................. B22F 3/00
[52] U.S. Cl. ................................................... 425/222
[58] Field of Search ........................................ 425/222

[56] References Cited

U.S. PATENT DOCUMENTS

| | | | |
|---|---|---|---|
| 2,671,646 | 3/1954 | Lindsey | 241/166 |
| 3,316,585 | 5/1967 | Kallberg | 425/222 |
| 3,348,262 | 10/1967 | Heian | 425/222 |
| 4,099,899 | 7/1978 | Gunnell | 425/222 |
| 4,207,050 | 6/1980 | Engelleitner | 425/222 |
| 4,212,615 | 7/1980 | Bennethum | 425/222 |
| 4,214,863 | 7/1980 | Nixon | 425/222 |

Primary Examiner—James R. Hall
Attorney, Agent, or Firm—Ronald C. Hudgens; Philip R. Cloutier; Patrick P. Pacella

[57] ABSTRACT

Scraper apparatus, preferably for pelletizers is disclosed, the scraper being adapted with a plurality of individual blades rotatable into contact with the walls of the pelletizer and removable after excessive wear.

3 Claims, 5 Drawing Figures

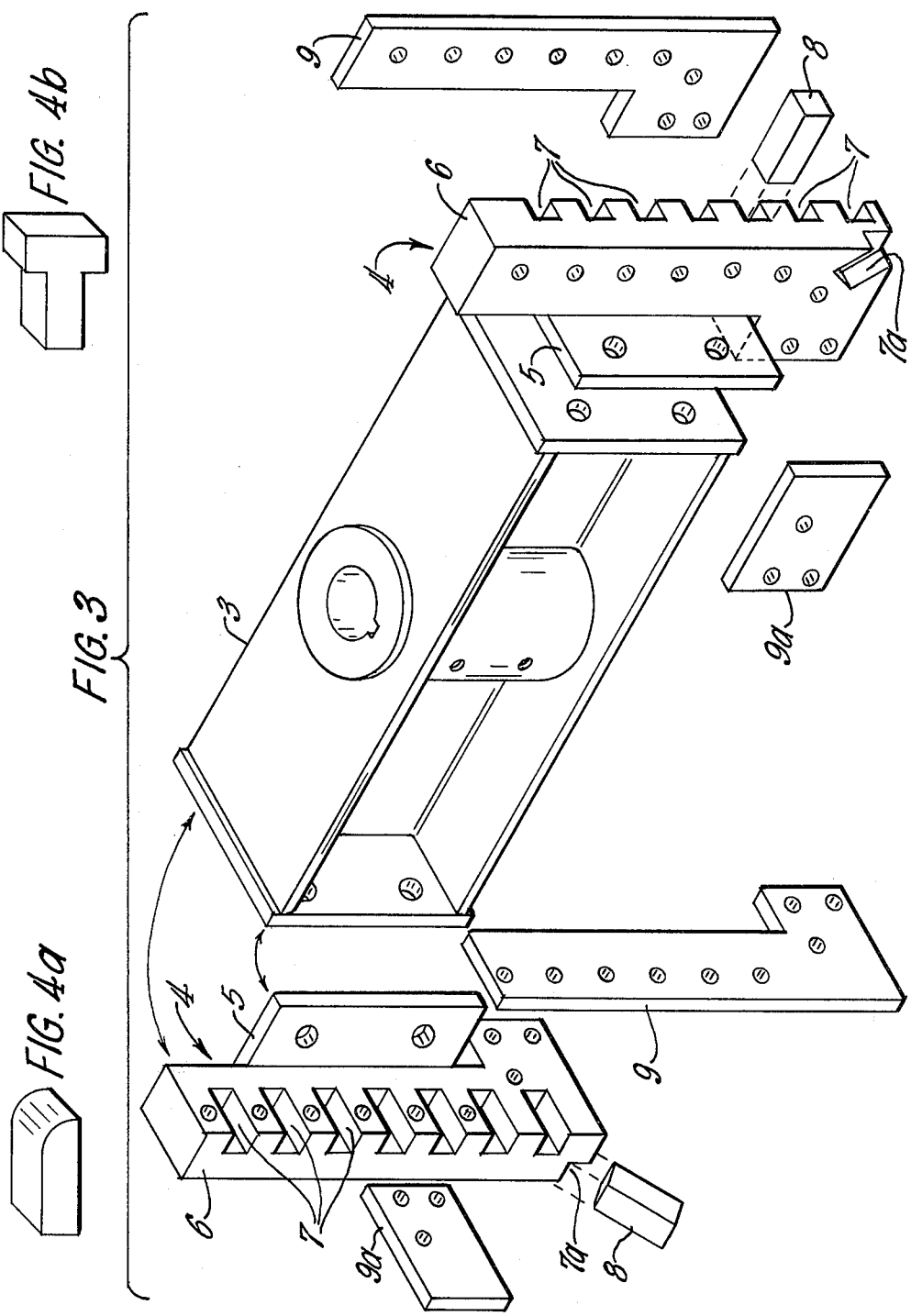

ROTARY SCRAPERS

This invention pertains to a rotary scraper and its use in pelletizing operations.

In one of its more specific aspects, this invention relates to a novel scraper and to its use in converting particulate matter into pellets.

In the process of producing glass fibers, it has been conventional to charge batch material, in particulate form, to a furnace wherein the batch material is melted to form glass. The molten glass is then further processed to form glass fibers.

Recently, for energy conservation reasons, it has been found advantageous to convert the particulate batch into pellets, preheat the pellets and introduce the preheated pellets into the furnace. However, because the pelletizing process involves the use of an aqueous medium, considerable difficulty has been experienced with adherence of the particulate matter to the interior walls of the circular pelletizer. The present invention is directed towards the solution of that problem by providing a rotary scraper which scrapes build-up from the inside walls of the circular pelletizer. This rotary scraper has good wear life, can employ carbide scraping surfaces, which can be quickly replaced, and operates so that both the bottom and the sides of the rotary pelletizer are scraped in the same action.

STATEMENT OF INVENTION

According to this invention, there is provided a scraper comprising a rotatable support, a blade carrier carried by the rotatable support, the blade carrier having a plurality of blade ports formed therein, a plurality of blades removably positioned in the blade ports and holding means in contact relationship with the blade carrier and in retaining relationship to the blades to maintain the blades in the blade ports.

BRIEF DESCRIPTION OF THE DRAWINGS

The apparatus of this invention will be more easily understood if explained with reference to the attached drawings in which:

FIG. 3 is an exploded view of the scraper of this invention; and

FIGS. 4a and b illustrate alternate shaped blades suitable for use in the scraper of this invention.

Figure 1:
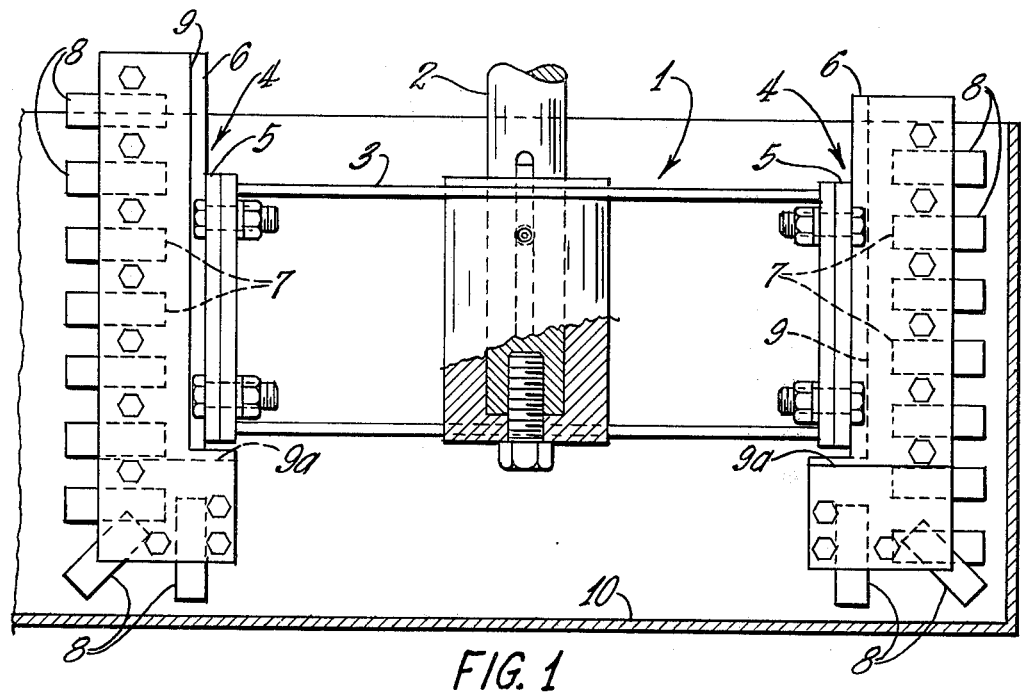
FIG. 1 is a view in elevation of the scraper of this invention in relation to a fragmentary section through a pelletizer with which it is associated.
Figure 2:
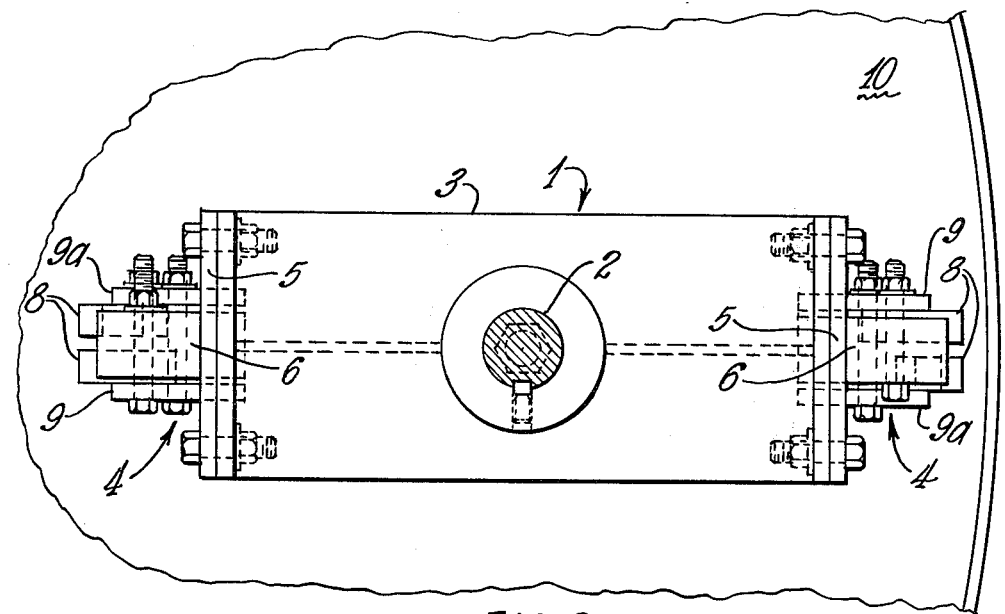
FIG. 2 is a plan view of the scraper of this invention in relation to a fragmentary section through a pelletizer with which it is associated.

Referring now to the figures, there is shown scraper 1 affixed to a rotatable support 2 rotated by means not shown. Affixed to the rotatable support 2 is scraper support 3 which can be of any suitable configuration satisfactory for carrying blade carrier 4.

Blade carrier 4 comprises attachment plate 5 which provides means for affixing to scraper support 3 by bolting, for example, and a blade retainer 6 which is adapted with a plurality of ports 7 into which scraper blades 8 are recessed. However, it is also to be understood that the attachment plate 5 of blade carrier 4 can be eliminated and blade retainer 6 affixed to scraper support by any suitable means, as for example, by bolting directly to scraper support 3.

Blade retainer 6 contains any suitable number of ports 7. The ports are positioned to hold the blades so that they project outwardly, horizontally and angularly, as port 7a is positioned, or vertically, upwardly or downwardly.

It will be seen that the blades, in blade retainer 6, are all positioned on one side of the blade retainer, or if angular projection from blade retainer 6 is desired, the ports are positioned on opposite sides of blade retainer 6 in order to avoid interference.

The blades are retained in blade retainer by any suitable means including bolting or by means of bolting one or more bearing plates 9, 9a to blade retainer 6 to firmly retain the blades 8 therebetween. For this purpose, the blades are made slightly wider than the blade retainer port such that the bearing plates come in compressive contact with the blades, themselves.

It will be seen that each end of scraper support 3 is adapted with a blade carrier. The blade carriers and blade arrangements therein are substantially identical except in the positioning of the ports and blades in blade retainer. Inasmuch as the blades in the retainers are spaced apart, this spacing is preferably somewhat less than the dimension of the blade providing the scraping action. Accordingly, the blades projecting from each blade retainer are alternately spaced in superimposed planar relation to each other. For example, if the blades of one blade retainer are considered to scrape along alternately positioned lanes 1, 3, 5, etc., the blades of the opposite blade retainer are positioned to scrape interpositioned lanes 2, 4, 6, etc., there being some overlap between lanes.

The scraper can be positioned in any desired relationship to the pelletizer 10. Preferably, it is positioned slightly above and spaced from the walls of the pelletizer with the distance between the blades and the walls of the pelletizer being slightly less than the thickness of the particulate matter accumulation which can be tolerated.

It will be appreciated that various modifications can be made to this invention. For example, the scraper can be adapted with two or more scraper support members which can be on the same plane, or on different planes, such that more frequent scraping on the same plane or alternate scrapings on different plane can be accomplished.

Similiarly, while the blade configurations shown in FIG. 3 are rectangular, a wide variety of blade configurations can be employed. For example, as shown in FIG. 4a, the blades can be rounded on either their leading or trailing edge. Or, as shown in FIG. 4b, the blades can be T-shaped such that adjacent blades scrape across at least a portion of the intervening lanes such that substantially the entire surface in contact with the blades is scraped at each pass with no intervening unscraped lanes remaining between blades.

It will be evident from the foregoing that various modifications can be made to this invention. Such, however, are within the scope of the invention.

I claim:

1. In a pelletizer for converting particulate material into pellets, having a need to remove build-up of said material from the inside walls of said pelletizer, the improvement comprising:
   (a) a rotatable scrapper support;
   (b) a blade carrier afixed to said support, said carrier being adapted with a plurality of ports for the positioning of a plurality of scraper blades therein, at least one of said scraper blades extending horizontally from one of said ports and at least one of said scraper blades extending angularly from another of said ports.

2. The pelletizer of claim 1 in which the end of one of said blades extending from one of said ports has a rounded edge.

3. The pelletizer of claim 1 in which the end of one of said blades extending from one of said ports has a T-shape configuration.

* * * * *